United States Patent Office 3,301,816
Patented Jan. 31, 1967

3,301,816
SOLID OLEFINE POLYMER COMPOSITIONS STABILIZED WITH A BENZOPHENONE AND A SULFUR COMPOUND
Robin Henry Burgess, Hertford, England, assignor to Imperial Chemical Industries Limited, London, England, a corporation of Great Britain
No Drawing. Filed May 21, 1962, Ser. No. 196,528
Claims priority, application Great Britain, May 30, 1962, 19,493/61
2 Claims. (Cl. 260—45.95)

The present invention relates to stabiliser compositions and to polymeric compositions usefully stabilised therewith.

It is well known that it is desirable to incorporate antioxidants into solid polymers and copolymers of aliphatic mono-$\alpha$-olefines e.g. polythene (the solid polymers of ethylene), polypropylene, polyisobutylene, polybutene-1, poly-3-methyl-butene-1, poly-4-methyl pentene-1, ethylene/propylene copolymers, These polymers, hereinafter will be referred to as solid olefine polymers as hereinbefore defined.

It is also known that the said solid olefine polymers are subject to degradation by light, particularly ultra violet light.

Since solid olefine polymers are generally processed, for example, shaped, at high temperatures, it is necessary for them to be stabilised against thermal degradation, particularly thermally induced oxidation, even though after shaping they may only be required to be used at relatively low temperatures. If they are to be exposed to direct sunlight for prolonged periods as, for example out of doors, it is clearly desirable that they should be effectively stabilised against light and heat.

It is unfortunately often true, however, that additives which have been proposed as light stabilisers have only a limited heat stabilising effect, if any, and heat stabilisers in general have little, if any, value as light stabilisers, and indeed some heat stabilisers are deleterious. It is, therefore, necessary for applications involving exposure to heat and light, particularly ultra violet light, to employ both a heat stabiliser and a light stabiliser. By the term heat stabiliser we mean both inhibitors of purely thermal degradation (molecular weight reduction), and inhibitors of oxidative degradation. The conventional heat stabilisers for the said polymeric materials are phenols and aromatic amines and a wide variety of these materials have been proposed for this purpose. In particular, it has been proposed to use mixtures of a di- or tri- benzoyl resorcinol as light stabiliser with a variety of amines and phenols as heat stabilisers. It is a disadvantage however with such combinations that in many cases the heat stabiliser somewhat reduces the efficiency of the light stabiliser. This is particularly true of the aromatic amines. The phenols may sometimes slightly increase the protection conferred by the light stabiliser.

It is an object of the present invention to provide stabiliser compositions wherein the activity of a light stabiliser is enhanced by the addition thereto of a heat stabiliser, the said composition being in preferred embodiments usefully stabilised against thermally induced oxidative degradation.

Accordingly the present invention provides stabiliser compositions comprising:

(a) An organic compound effective as a stabiliser against degradation induced by visible or ultra violet light and having a phenolic nucleus with an organic ortho-substituent attached thereto by a carbon or nitrogen atom (1) to which is attached an oxygen or nitrogen atom (2) linked within the molecule by a double bond, said substituent having an aromatic residue attached to atom (1) or (2), and (b) At least one sulphur compound of molecule weight at least 250 and containing at least one sulphide-sulphur containing group (1) having at least two sulphur atoms linked to a single carbon atom, the said groups (1) preferably each having not more than one hydrogen atom attached to the carbon atom which joins the sulphur atoms, the residual valances being satisfied by organic groups which may link two or more groups (1) together and in which at least one, preferably at least two carbon atoms separate any aryl group from sulphur atoms in any group (1), and at least one, preferably at least two carbon atoms separate any aryl residue in any organic group which is attached by a carbon atom to the carbon atom of a group (1) from said carbon atom of group (1).

It is preferred that any organic group attached to the carbon atom of a group (1) is aliphatic.

It is also preferred that any other organic groups in the sulphur compound are aliphatic. Aliphatic hydrocarbon groups are particularly preferred for their effectiveness and for reasons of economy.

The main classes of sulphur compound which may be used are alkylidene and certain aralkylidene mercaptals and mercaptols, orthothioesters, orthothiocarbonates, and alkylidene and certain aralkylidene polymeric mercaptals and mercaptols.

Examples of mercaptals and mercaptols are (a) simple mercaptals and mercaptols e.g. 19,21-dithia nonatriacontane, nonylidene distearyl mercaptal, nonylidene di($\omega$-mercapto-n-decyl) mercaptol, condensates of one molecule of crotonaldehyde or cinnamaldehyde with three molecules of a mercaptan, glyoxal tetralauryl mercaptal, acetone distearyl mercaptol, (b) mercaptals of esters or amides of mercapto alkanoic acids e.g. the butylidene dimercaptal of lauryl $\gamma$-mercaptobutyrate, (c) heterocyclic compounds e.g. the trimers of thiononaldehyde and methyl undecyl thioketone, and the cyclic mercaptals of ethylene dithiol or trimethylene dithiol, (d) polymeric mercaptals e.g. condensates of 3-methyl hexanal, or nonanal with glycol dimercapto acetate, di($\beta$-mercapto ethyl) adipate, glycol dimercaptobutyramide, hexamethylene dithiol, decamethylene dithiol and (e) orthothioesters e.g. stearyl ortho thioformate, hexyl orthothio-oxalate, lauryl ortho thioacetate, cyclohexyl orthothiocarbonate.

Our sulphur compounds should preferably have a molecular weight of at least 350. This is in order to ensure a satisfactorily low volatility, so that they are not easily lost from the compositions during processing or use at elevated temperatures. Sulphur compounds having molecular weights as low as about 250 may however be used for stabilising compositions which are not to be exposed to temperatures such that volatilisation is significant.

The volatility of the sulphur compounds decreases so rapidly as their molecular weights increase, however, that there is no substantial gain in using sulphur compounds having molecular weights greater than about 1,000. On the other hand, if the molecular weight of the sulphur compound is very high it may be difficult to incorporate it into the polymer by reason of its high melt viscosity or lowered compatibility with the polymer.

Sulphur compounds having large hydrocarbon substituents are particularly suitable, since the hydrocarbon substituents increase the compatibility of the sulphur compound with hydrocarbon polymers. We prefer large alkyl substituents, e.g., tertiary butyl, isoctyl, nonyl and lauryl groups.

We therefore prefer to use sulphur compounds having average molecular weights between about 250 and about 5,000, particularly between about 350 and about 1,000. Relatively high molecular weight sulphur compounds, e.g. of molecular weight between about 3,000 and 5,000 in some cases improve the impact strength and lower the brittleness temperature of our compositions.

One preferred class (1) of light stabilisers has the structure A.CO.A' or A.CO.A'.CO.A", wherein A, A' and A" are aromatic nuclei having altogether at least 1 hydroxyl group ortho to a carbonyl group which links nuclear carbon atoms of said nuclei, A, A' and A" being the same or different, and there being in each benzene ring at most 1 hydroxyl group ortho to any one of said carbonyl groups. Other substituents which may be present are further hydroxyl groups, alkoxyl groups or alkyl groups. Said further hydroxyl groups may if desired be esterified to form simple esters or polyesters or condensed with epoxides to form polyethers. If desired 2 or more molecules may be attached through a carbon or oxygen atom of a group A to a hydrocarbon group, for instance as side groups of a polymeric chain. It is preferred that any alkyl or alkoxyl or other inert substituents have from 1 to 18, more particularly from 6 to 18 carbon atoms, as groups having from 6 to 18 carbon atoms confer improved compatibility with polymer materials on the light stabiliser, without unduly diluting its activity by overloading the molecule with inert groups. Examples of compounds of class (1) which may be used are the benzophenones having a 2-hydroxyl substituent, with if desired substituents selected from hydroxyl, alkoxyl or alkyl groups in positions 2', 4 and 4' (the 2,4- and 2,2',4-substituted compounds being preferred) for instance, the 2,2'-dihydroxy 4,4'-dimethoxy, 2,4-dihydroxy, 2-hydroxy-4-allyl, 2-hydroxy-4-tertiary butyl, 2-hydroxy-4-n-octyl, 2-hydroxy-4-(2' ethyl hexyl), 2-hydroxy-(3',5',5' trimethyl hexyl), 2-hydroxy-4-dodecyl, 2-hydroxy-4-tridecyl, 2-hydroxy-4-n-hexadecyl, 2-hydroxyl-4-n-octadecyl and the corresponding 2 - hydroxy - 4 - hydrocarbonoxy benzophenones, 2,4,4'-tri-hydroxy, 2,2',4,4'-tetra hydroxy, 2,2'-dihydroxy-4-octyloxy, 2,2'-dihydroxy-4-dodecyloxy, 2,2'-dihydroxy-4-octyl, and 2,2'-dihydroxy-4-dodecyl benzophenones.

Substituents may also be present in the 5 positions as for instance in 2,4,5-trihydroxy benzophenone and 2-hydroxy-5-octyl benzophenone. Examples of other compounds which may be used are the dibenzoyl and disalicyloyl resorcinols.

A second preferred class (2) of light stabiliser comprises aromatic particularly alkaryl esters of hydroxy aromatic acids for example the benzoates, salicylates, gentisates, cresotates (e.g. 2-hydroxy-3- (or -5-) methyl benzoates) and β-resorcylates of mono-, di-, or tri-hydric phenols or of phenolic compounds containinig more than 1 phenolic nucleus. Esters and polyesters formed by the self-condensation of the said phenolic acids may also be used if the said esters contain a hydroxyl group ortho to an ester linkage.

In some cases the aroyl groups in the aromatic esters of aromatic acids may migrate under the influence of ultra violet light to give compounds of class (1). Particular examples of compounds of class (2) which may be used are para-tertiary butyl phenyl salicylate, p-tertiary octyl phenyl salicylate pyrogallol tri-salicylate, resorcinol mono-gentisate, polyesters of β-resorcylic or gentisic acids, catechol mono-salicylate, and hydroquinone β-resorcylate.

The alkaryl esters, particularly those in which the alkyl residue of the alkaryl group has from 4 to 18 carbon atoms are preferred.

Other very active light stabilisers are (3) the 2-(2' - hydroxyaryl) benzotriazoles, for instance, the 5'-methyl, 5'-tertiary butyl, 5'-amyl, 5'-cyclohexyl, 5'-phenyl, 5'-methoxy, 5'-carbethoxy, 3',5'-dimethyl, 3',5'-dichloro, 4',5'-dichloro, 5'-tertiary butyl-5-chloro, 5'-phenyl-5-chloro, 5'-cyclohexyl-5-chloro, 5'-phenyl-5-methyl, 5'-methyl-5-ethylsulphonyl, 3',5'-dimethyl-5-methyl, 3',5'-dimethyl-5-methoxy, 5'-methyl-5,6-dichloro, and 3',5'-dimethyl-5-ethyl sulphonyl derivatives of 2-(2'-hydroxy phenyl) benzotriazole, and the esters, e.g. tertiary butyl and hexyl esters, of 2-(2'-hydroxy-5'-methylphenyl) benzotriazole-5-carboxylic acid and 2-(2'-hydroxy-4',5'-dimethyl phenyl) benzotriazole-5-carboxylic acid.

Of these, the 5'-methyl and the 5'-tertiary butyl-5-chloro derivatives, particularly the latter, are preferred.

The structural elements of the various classes believed to be responsible for the activity are as follows:

A, A' and A" being as hereinbefore defined, and —V being —OH or —H.

In class 2, A' may contain carboxyl groups.

Class 1:

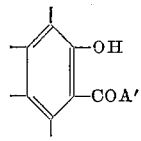

wherein if desired a further group A"CO— may be attached to the ring shown or to A'.

Class 2:

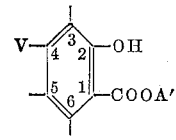

wherein if desired the structure shown may represent a part of a polyester linked through a hydroxyl group at position 4 and a carboxyl group at position 1.

Class 3:

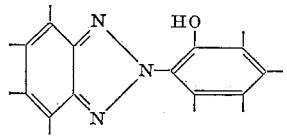

It will be understood that the structure depicted for the benzotriazoles represents only one of the contributing resonance structures; the others are

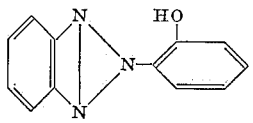

and the equivalent structures differing from this (or from that first depicted) only in the arrangement of the double bonds in the benzene ring or rings.

It will be seen from the above that there are structural similarities between compounds of classes 1, 2 and 3 since all the compounds have a group —OH closely adjacent to a doubly bound oxygen or nitrogen atom; it is believed that internal hydrogen bonding occurs in these compounds leading to the formation of a six-membered ring.

The organic sulphur compounds give a useful increase in the light stability of the compositions and some protection against oxidative degradation.

For applications in which resistance to thermally induced oxidative degradation is very important, the excellent light stability of our compositions allows for some depression of this stability by the inclusion of a small amount of a phenolic compound in order to improve the heat stability.

Preferred phenolic antioxidants are the condensates of three molecules of a 3-alkyl (or alkoxy)-6-branched alkyl-phenol with one molecule of an unsaturated aldehyde or ketone, particularly condensates of 3-methyl-6-tertiary butyl phenol or 3-methyl-6-tertiary octyl phenol with crotonaldehyde or cinnamaldehyde.

Other phenolic antioxidants which may be used are for instance spirohydrindenes obtainable by the condensation of two molecules of a phenol having a meta and the para position free with three molecules of a ketone R.CH$_2$COCH$_2$R' when R and R' are hydrocarbon groups or hydrogen atoms, spirochromans obtainable by the condensation of two molecules of hydroxyhydroquinone with three molecules of a ketone RCH$_2$COCH$_2$R', alkylidene bisphenols in which the alkylidene group preferably has from six to nine carbon atoms, and thiobisphenols e.g. thiobis-(3-methyl-6-tertiary butyl phenol). The phenolic antioxidant should preferably have a boiling point at a pressure of 1 mm. of mercury of at least 200° C.

Accordingly the present invention provides stabiliser compositions comprising mixtures of—

(a) A light stabiliser as hereinbefore defined.

(b) At least one sulphur compound of molecular weight at least 250 and containing at least one sulphide-sulphur containing group (1) having at least two sulphur atoms linked to a single carbon atom, the said groups (1) preferably each having not more than one hydrogen atom attached to the carbon atom which joins the sulphur atoms, the residual valences being satisfied by organic groups which may link two or more groups (1) together and in which at least one, preferably at least two carbon atoms separate any aryl group from sulphur atoms in any group (1), and at least one, preferably at least two carbon atoms separate any aryl residue in any organic group which is attached by a carbon atom to the carbon atom of a group (1) from said carbon atom of group (1), and (c) A phenolic antioxidant having at least two phenolic nuclei and having a boiling point at a pressure of 1 mm. of mercury of at least 200° C. in an amount corresponding to up to 5 phenolic hydroxyl groups for each sulphur atom provided by (b).

Whilst we find that useful stabiliser compositions may be obtained with widely varied ratios of said compound (b) to said light stabiliser, and whilst our invention is in no way limited to particular ratios of these ingredients, we find that particularly effective ratios of these ingredients are when there are from 0.1 to 10 of the said ortho-substituted phenolic nuclei provided to the composition by the light stabiliser to each sulphur atom provided to the composition by the compound (b).

The content of these components in these compositions may also be varied over very wide limits. Thus, compositions useful for a wide variety of applications, e.g. for making films are effectively stabilised with, for example, 1% by weight of the light stabiliser with an appropriate added amount of the compound (b). For other applications, e.g. mouldings, smaller amounts, e.g. 0.1% or even less by weight of the light stabiliser are usually sufficient. In general it is not necessary to use more than 5% by weight and normally not more than 0.5 to 1% by weight of the light stabiliser, appropriate quantities of the compound (b) being used in conjunction with this light stabiliser.

The compositions of this invention may be prepared in a variety of ways depending upon the manner in which the polymeric material is obtained and the amount of stabilising material to be incorporated in the composition. Small amounts of the stabilising material may be incorporated into polythene made by the high pressure process by dissolving the stabilising components in a high boiling hydrocarbon liquid and mixing this solution with the hot polythene in a suitable container after the polythene issues from the converter in which it is produced. Larger quantities of the stabilising components may be mixed with polythene or any polymeric material by any of the mastication processes. A satisfactory method for mixing the stabilising ingredients with, for example, polythene or polypropylene, made by the low pressure process is to add a solution of the components to polythene powder obtained by this process and then to remove the solvent for the stabilising components by evaporation.

The compositions of this invention may also contain further ancillary ingredients such as processing aids, for example, the soaps of calcium and zinc, and also such materials as pigments, dyes and fillers.

EXAMPLE 1

Polythene of melt flow index 2 (as measured by the A.S.T.M. method) was mixed on open rolls at 140° C. with light stabilisers and compounds (b), as set out below.

The compositions were presesd at 150° C. into sheets 5/1000 of an inch thick.

Samples of an inch long by 7/8 of an inch wide cut from the sheet were placed on microscope slides in an air oven at 140° C. Samples were removed at intervals and the extent of oxidation was estimated by measuring carbonyl group concentration by infra-red spectroscopy using the absorption band at 5.85 microns wave length. The time before the oxygen present as carbonyl was greater than 0.1% was measured.

Samples of sheet were placed 10 cm. from a Hanovia S500 high pressure mercury arc lamp screened by ½ mm. borosilicate glass (cutting out light of wavelengths less than 2950 A.) and the development of carbonyl groups followed by periodical infra-red examination of the samples. The reported lifetimes represent times for the development of 0.2% of carbonyl oxygen for the 5/1000 of an inch thick sheets.

Results were as follows:

Table 1

[All 5 thousandths of an inch thick]

| Experiment | UV Absorber | Compound (b) | Percent by weight of Composition (in order of appearance) | UV Life (days) | 140° C. oven life (hrs.) |
|---|---|---|---|---|---|
|  | None | None |  | 16 | 2½ |
|  | 2-HO-4-C;OBP "A" | ----do---- | 0.5 | 50 | 2½ |
|  | p-Octyl phenyl salicylate "B" | ----do---- | 1.0 | 25 | 2½ |
|  | None | HMD/N | 0.5 | 31 | 65 |
| 1 | "A" | HMD/N | 0.5/0.5 | 63 | 450 |
| 2 | "B" | CM/N | 0.5/0.5 | 30 | 40 |

Note.—See Table 2 for identification of abbreviations.

EXAMPLE 2

Polypropylene of melt-flow index 5 (as measured by the A.S.T.M. method modified by using a 10 kg. weight instead of that specified for causing extrusion) was mixed on open rolls at 170° C. with light stabilisers and compounds (b) as set out below.

The compositions were pressed at 190° C. into sheets of thickness 1/50 of an inch. 1 inch square samples were aged at 140° C. in an air oven and the time to embrittlement recorded.

The ultra violet testing was as in Example 1, except that the carbonyl oxygen concentration used was 0.06%.

Table 2

[All 20 thousandths of an inch thick]

| Experiment | UV Absorber | Compound (b) | Percent by weight of Composition (in order of appearance) | UV Life (days) | 140° C. oven life (hrs.) |
|---|---|---|---|---|---|
| | None | None | | 1½ | <25 |
| | 2-HO-4-C$_{12}$OBP "A" | do | 0.5 | 28 | <25 |
| | 2-(2'HO-5-Me ph) BT "B" | do | 0.5 | 8 | <25 |
| | 2-(2'HO-5' tb ph) BT "C" | do | 0.5 | 13 | <25 |
| | None | HMD/N "D" | 0.5 | 9 | 215 |
| | do | CM/N "E" | 0.5 | 9 | 100 |
| 1 | A | "D" | 0.5/0.5 | 52 | 50 |
| 2 | B | "E" | 0.5/0.5 | 26 | 190 |
| 3 | C | "D" | 0.5/0.5 | 32 | 315 |

ABBREVIATIONS FOR TABLES 1 AND 2.—HO=hydroxy. C$_7$O=heptyloxy. C$_{12}$O=dodecyloxy. BP=benzophenone. me=methyl. tb=tertiary butyl. ph=phenyl. BT=benzotriazole. HMD/N=hexamethylene dithiol/2-nonanone. CM/N=cetyl mercaptan/nonaldehyde.

The addition of 0.3% by weight of a condensate of 3 molecules of 3-methyl-6-tertiary butyl phenol and one molecule of crotonaldehyde to the above compositions considerably increase their resistance to thermally induced oxidation. Their resistance to ultra violet light is at the same time slightly lowered.

I claim:
1. A stabilizer composition comprising
   (a) as a light stabilizer, 2-hydroxy-4-heptyloxy benzophenone and
   (b) a mercaptol having a molecular weight of at least 250 which is the condensate of hexamethylene dithiol and 2-nonanone
   there being from 0.1 to 10 orthophenolic nuclei provided to the composition by said light stabilizer to each sulfur atom provided to the composition by each mercaptol.
2. A polymeric composition comprising a solid alpha-mono olefin composition and a composition as set forth in claim 1, the amount of said light stabilizer being from 0.1 to 5% by weight of the polymeric composition.

References Cited by the Examiner

UNITED STATES PATENTS

| | | | |
|---|---|---|---|
| 2,582,510 | 1/1952 | Stratelli | 260—45.7 |
| 2,967,845 | 1/1961 | Hawkins et al. | 260—45.7 |
| 2,967,847 | 1/1961 | Hawkins et al. | 260—45.7 |
| 2,967,848 | 1/1961 | Hawkins et al. | 260—45.7 |
| 2,967,849 | 1/1961 | Hawkins et al. | 260—45.7 |
| 2,967,850 | 1/1961 | Hawkins et al. | 260—45.7 |
| 2,976,259 | 3/1961 | Hardy et al. | 260—45.95 |
| 3,004,896 | 10/1961 | Heller et al. | 260—45.8 |
| 3,010,937 | 11/1961 | Roos et al. | 260—45.7 |
| 3,033,814 | 5/1962 | Tholstrup | 260—45.95 |
| 3,060,121 | 10/1962 | Orloff et al. | 260—45.95 |
| 3,119,784 | 1/1964 | Baum | 260—45.7 |
| 3,196,185 | 7/1965 | Ranson | 260—45.95 |

LEON J. BERCOVITZ, *Primary Examiner.*

H. E. TAYLOR, *Assistant Examiner.*